Feb. 15, 1966 K. ZUSE 3,234,819

COUPLING MEANS FOR SELECTIVELY CLUTCHING DRIVEN SHAFTS TO A DRIVING SHAFT

Filed April 26, 1962 2 Sheets-Sheet 1

INVENTOR
KONRAD ZUSE

By: Silverman, Mullin & Cass
Attorneys

INVENTOR
KONRAD ZUSE

BY Silverman & Cass
ATTORNEY

United States Patent Office 3,234,819
Patented Feb. 15, 1966

3,234,819
COUPLING MEANS FOR SELECTIVELY CLUTCHING DRIVEN SHAFTS TO A DRIVING SHAFT
Konrad Zuse, Hunfeld, Rhon, im Haselgrund, Germany, assignor to Messrs. Zuse KG, Bad Hersfeld, Germany
Filed Apr. 26, 1962, Ser. No. 190,335
Claims priority, application Germany, May 10, 1961, Z 8,738
3 Claims. (Cl. 74—665)

The present invention relates to a novel coupling means for selectively coupling one or the other of a pair of parallel driving shafts to a driven shaft. Since the pair of driving shafts rotate constantly with equal angular velocities, but in opposite directions, the driven shaft is capable of rotating at three distinct angular velocities, or speeds.

The first velocity is zero, and this occurs when the driven shaft is motionless since neither driving shaft is coupled to the driven shaft. When one parallel shaft is coupled to the driven shaft, the resultant speed of the driven shaft is considered to be "plus 1," or "+1." When the other shaft is coupled, the resultant speed is considered to be "minus 1" or "—1." The notation of "plus" or "minus" is an arbitrary choice to designate clockwise or counter-clockwise rotation, and the numeral "1" indicates that the resultant motion is at an angular velocity equal to that of the driving shaft.

In an alternative embodiment discussed hereinafter, five distinct velocity ratios can be obtained without modification of the basic coupling means.

Such multi-ratio gear units are used e.g. in gear mechanisms as set forth in the German Patent 971,296. For covering a greater speed range by the means taught in this patent a comparatively great number of gears are necessary, whereby the construction of the gear train becomes relatively space consuming. Furtherfore the sources of error in respect to adjustment precision are multiplied.

It is the object of the present invention to provide a multi-ratio gear unit by means of which a wider speed range can be covered with a fewer number of gears, than with gear units employed in the German patent referred to, the new unit being of simple construction so that also sources of errors in adjustment precision are minimized.

It is another object of this invention to construct a gear unit capable of three distinct speed ratios, which can receive both "positive" and "negative" motion, as described above without resort to an idler gear. In the multi-ratio gear units previously known such as disclosed in the German patent cited above, an idler gear was an integral part of the motion reversing mechanism of that unit.

A further object of this invention is to provide coupling means requiring a minimum of space and permitting easy and precise coupling of the driven shaft selectively to one of the driving shafts.

It is still another object of this invention to construct coupling means for the gear unit permitting a thrust- and slip-free coupling of the driven shaft to either one of the pair of driving shafts.

Further features of the invention will be revealed hereinafter in connection with the following description and the accompanying drawings in which:

FIG. 1a is a side elevational cross-sectional view of a structural detail of FIG. 1, taken along the line 1a–1a;

Figure 4:
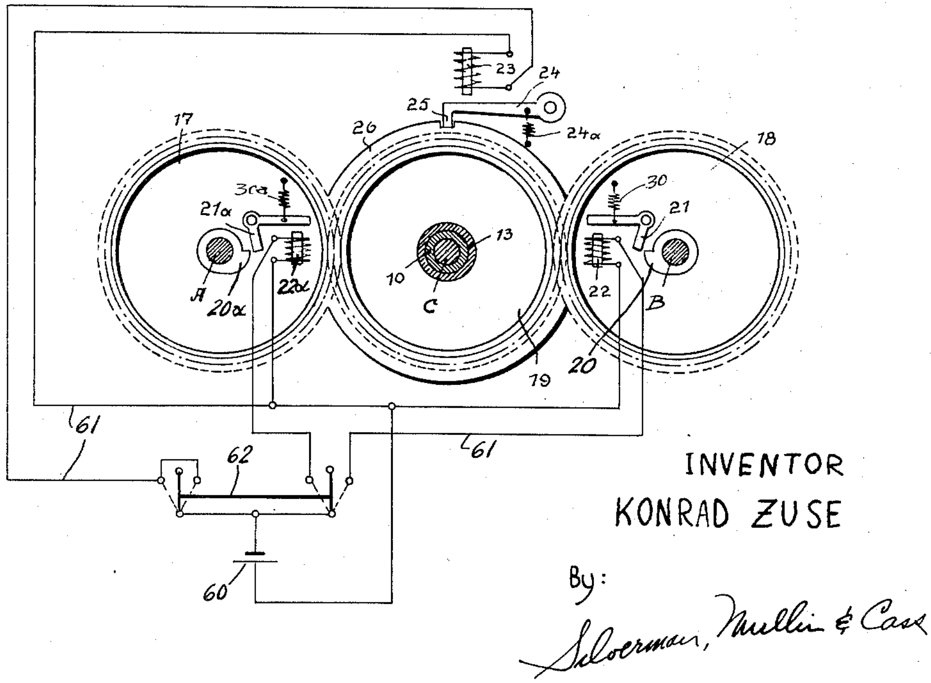
Figure 2:
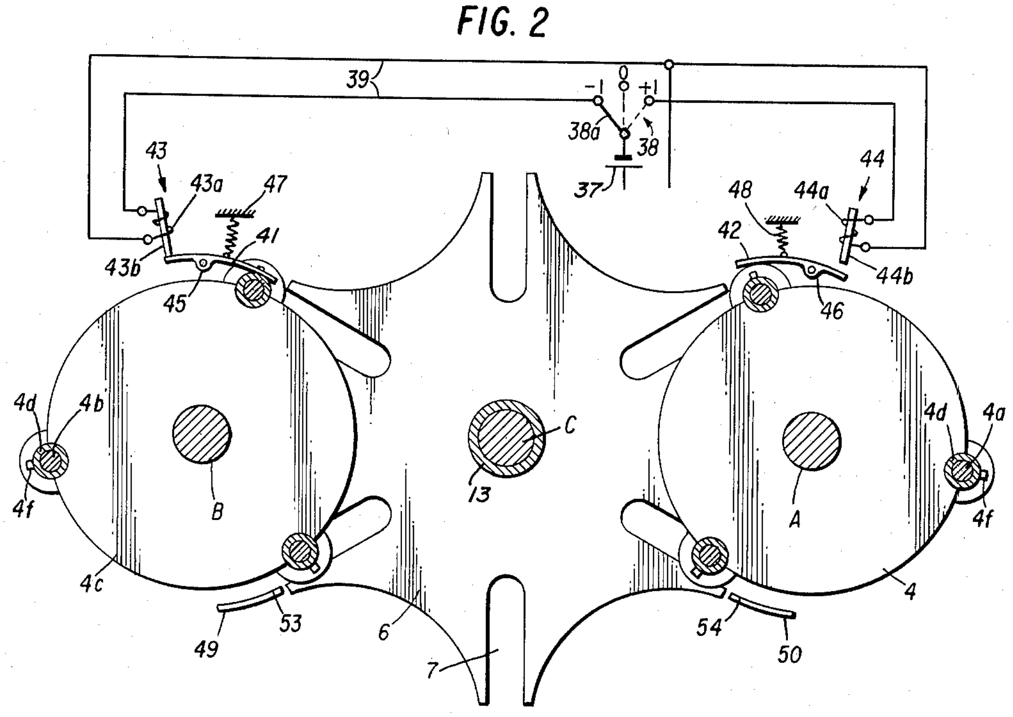
Figure 3B:
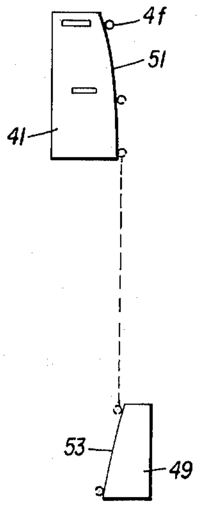
Figure 3A:
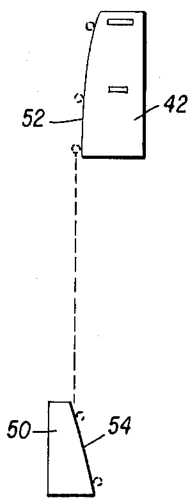

FIG. 2 in greater detail shows means for engaging the Geneva wheel selectively with one of the driving shafts;

FIGS. 3a and 3b are top views of guiding means represented in FIG. 2 for engaging and disengaging the driving shafts and the driven shaft;

FIG. 4 schematically shows a transverse cross-sectional view of another embodiment according to this invention, having cam and ratchet means for coupling the driven shaft selectively to one of the driving shafts.

Figure 1:
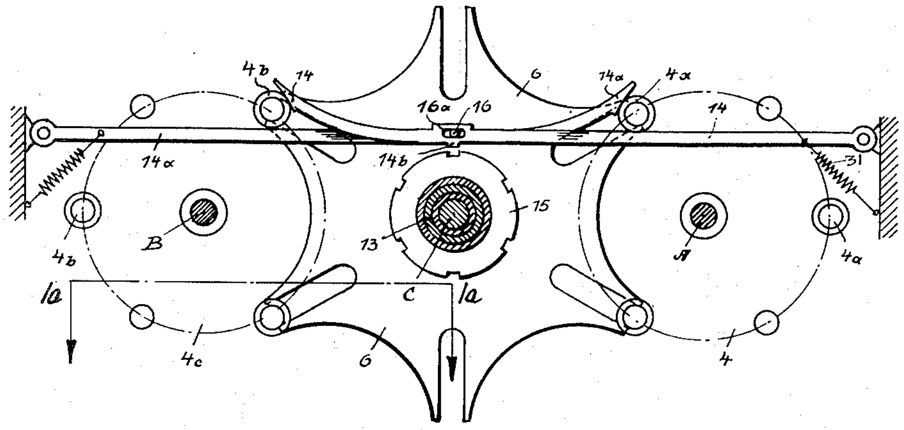
FIG. 1 shows schematically a transverse cross-sectional view of one embodiment of a gear unit according to this invention, having a Geneva wheel for coupling the driven shaft to one of the driving shafts.

Referring now to FIG. 1, the individual gear unit has a stationary axis C representative for a common axis of a plurality of associated gear units. A Geneva wheel 6 with radial slots 7 is rotatably mounted on the shaft C by means of a hollow shaft surrounding the shaft C and secured to the Geneva wheel 6, this hollow shaft functioning here as driven shaft.

Two driving shafts A and B are provided which in the present case rotate continuously in opposite directions but at the same speed. Each driving shaft A, B is provided with a driving disc 4 or 4c, respectively which in turn each carry, distributed on the periphery, several driving rollers 4a and 4b, respectively. In the example chosen, three such driving rollers are associated with each disk. The disks are fixedly mounted on their respective shafts. The driving rollers are journalled on the driving disks in axial sleeves 4d (FIG. 1a) and can be shifted axially.

The relationship between the driving shafts A and B with their respective driving disks 4 and 4c and their driving rollers 4a, 4b on the one hand and the driven shaft 13 with its Geneva wheel 6 and the slots 7 provided theerin is such, that either the driving rollers 4a or the driving rollers 4b can engage the slots 7, so that consequently the driven shaft 13 is either connected to the driving shaft A or to the driving shaft B. In their neutral poistion the driving rollers do not engage into the slots of the Geneva wheel 6. For shifting the driving rollers in the axial sleeves 4d, guiding levers 41, 42 are arranged, as shown in FIG. 2, which are operated mechanically, pneumatically or hydraulically, but preferably by means of electromagnets 43 and 44 including the coils 43a and 44a and the cores 43b and 44b. Both guiding levers are pivotally mounted on pins 45 and 46 and are movable between an active and an inactive position. Springs 47 and 48, respectively, normally hold the two levers in their inactive position.

Figure 1A:
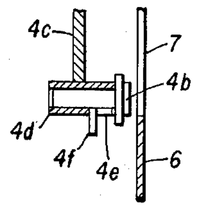

FIG. 1a explains that the sleeve 4d is provided with an axial slot 4e through which protrudes a radial bolt 4f secured to the driving roller 4b, the corresponding being true for the driving roller 4a.

A second type of guiding members 49, 50 is located in an area where the driving rollers 4a, 4b leave slots 7 of the Geneva wheel 6 after their engagement therewith. These members are fixedly mounted. As apparent from FIGS. 3a and 3b, guiding levers 41, 42 and guiding members 49, 50 are provided with curved guiding surfaces 51, 52 and 53, 54.

The electromagnets 43 and 44 are capable of being energized through switch unit 38 and conduits 39 by means of battery 37 connected therewith. By turning the contact arm 38a of the switch unit 38 into its —1 position, the electromagnet 43 is energized, core 43a becomes magnetic and attracts the pivotally mounted guiding lever 41 against the influence of the spring 47. Consequently guiding surface 51 (FIG. 3a) extends now in an area crossed by the protruding bolt 4f. Bolt 4f engages the curved surface 51 and consequently, when the rotational movement of shaft B is continued, is shifted in axial direction in its sleeve 4d towards the axially slightly displaced Geneva wheel 6. Being now in its active position, driving roll 4b enters slot 7 and positively moves Geneva wheel 6 in counter-clockwise direction. After having rotated Genera wheel 6 for an angle of 60°, driving roll 4b leaves slot 7 and its bolt *4d* now engages guiding surface 53 of the guiding member 49. This guiding surface, as shown in FIG. 3*b*, extends in a direction so that driving roll *4b* is axially shifted into its inactive position.

As long as contact 38 remains in the −1 position, each driving roll *4b* approaching Geneva wheel 6 is shifted by means of the guiding lever 41 into its active position, turns Geneva wheel for 60° and is subsequently disengaged by the guiding member 49. This continues until electromagnet 43 is de-energized by removing contact *38a* from its −1 position.

None of the driving rolls *4a*, *4b* is shifted into its active position when contact arm *38a* is in the neutral position "0."

Assuming the +1 position, contact arm *38a* causes excitement of elecromagnet 44 so that now guiding lever 42 shifts driving rolls *4a* into their corresponding active positions, Geneva wheel 6 then being rotated in clockwise direction. Guiding member 50 with its guiding surface 54 enables driving roll *4a* to return into its inactive position.

As is shown in FIG. 1, the Geneva wheel 6 mounted on a shaft C is alternatively locked in both neutral and engagement positions by a spring-loaded double-stop lever 14, *14a* by means of a wheel 6 disk 15 provided with notches and fastened on the Geneva wheel 6. When e.g. the driving roller *4a* is shifted to its active position and approaches the next slot 7, it engages a curved end of stop lever *14a* immediately before entering the slot. Stop nose *14b* is therefore disengaged from the notched disk 15, thereby releasing Geneva wheel 6.

When the driving roller *4a* leaves the slot of a Geneva stop after the rotation of the Geneva wheel 6 for 60°, the Geneva wheel 6 is locked again by means of the stop disk 15 unless the following driving roller *4a* is shifted into its active position.

The same process takes place when the Geneva wheel is driven by means of the driving roller *4b* of the drive disk *4c* on the shaft B running in opposite direction to shaft A. As both lever parts 14 and *14a* of the double locking lever are connected with each other by a pin 16, engaging into a longitudinal slot *16a*, they effect in interdependence from each other the engagement and disengagement of the stop disk 15 and thus the neutral position of the Geneva stop 6 or the release of it. Springs 31 normally hold stop nose *14b* in engagement with notched disk 15 to keep Geneva wheel 6 motionless.

Instead of using a thrust-free coupling as provided by the Geneva wheel-driving rolls arrangement there is, of course, also the possibility, according to FIG. 4, of transferring the rotational speeds of the continuously running drive shafts A and B which run in opposite directions, to the driven shaft 13 by means of the driven gear 19, which meshes with intermediate gears 17 or 18, which are loosely rotatable on their drive shafts A and B. On each intermediate gear 17, 18 there is arranged a pivoted stop lever 21 or *21a* respectively, which is under the influence of a tension spring 30 or *30a*, normally holding the levers 21, *21a* in an active position out of engagement with cam disks 20 and *20a*, fixedly mounted on shafts A and B, respectively.

When magnets 22, *22a* are excited by means of a battery 60, lines 61 and a suitable switch unit 62, the levers 21, *21a* are moved towards their corresponding magnets overcoming the force of their tension springs 30, *30a* and the ratchet parts of the levers travel towards cam 20 or *20a*. Due to the radially protruding surface of the cam 20 or *20a* the intermediate gear 17 or 18 is taken along correspondingly to the speed of the shaft A or B, one of these gears then driving the driven gear 19, the other one freely rotating about its corresponding shaft. The switch unit 62 is connected with the magnets 22, *22a* and 23 in a conventional manner so that always only one of the two magnets 22, *22a* can be energized, gear 19 accordingly being coupled definitely only either to driving shaft A or to driving shaft B; the connection of the switch unit 62 is furthermore chosen so that simultaneously with either magnet 22 or *22a* the magnet 23 above the gear wheel 19 is energized and lifts the ratchet 24 with its nose 25 from the notch of the stop disk 26, which is firmly connected with the gear wheel 19, and releases it. Due to disconnecting the magnets 22 and 23 simultaneously not only the speed transfer from one of the driving shafts to the intermediate gear 17 or 18 is interrupted, but it is also ensured that the gear wheel 19 with its stop disk 26 is again locked by the locking device 24, *24a*, 25.

It is believed that the invention has been described in adequate detail to enable the skilled artisan to understand and practice the same. Minor variations in the mechanisms set forth herein are believed possible without departing from the scope and the spirit of the invention as defined in the appended claims.

I claim:

1. In a gear unit capable of rotating at a plurality of distinct, angular velocity ratios, representing counterclockwies motion, no motion, and clockwise motion, the combination of: a driven shaft, a pair of parallel driving shafts, said driving shafts adapted to rotate in opposite directions at constant velocities, a driving member fixedly mounted on each of said driving shafts, a driven member fixedly mounted on said driven shaft, said driving and said driven members being in fixed position with respect to the longitudinal axes of said driving shafts and said driven shaft, connecting means movable between an active and an inactive position selectively to be interconnected between said driven member and one of said driving members selectively to couple said driven shaft to one of said driving shafts, rotatable stop means provided on said driven member, and stationary stop means normally engaging said rotatable stop means to hold said driven member motionless, said stationary stop means adapted to be disengaged from said rotatable stop means when said connecting means selectively are interconnected between said driven member and one of said driving members.

2. In a gear unit capable of rotating at a plurality of distinct, angular velocity ratios, representing counter-clockwise motion, no motion and clockwise motion, the combination of: a driven shaft, a first and a second driving shaft parallel to each other and to said driven shaft, said driving shafts adapted to continuously rotate at a constant velocity in opposite directions, a disc driving member fixedly mounted on each of said driving shafts, a Geneva wheel driven member having radial slots, said Geneva wheel member mounted on said driven shaft and adapted to rotate therewith, connecting means mounted along the outer circumference of each of said driving discs, and adapted to cooperate with said slots, means selectively to shift said connecting means of one of said driving discs into engagement with said slots so selectively to couple said Geneva wheel positively to one of said driving discs, a notched stop disc means rigidly secured to said Geneva wheel, a pair of stop levers, said levers being joined together by pin and slot connection, a stop nose extending from said levers, said nose being biased into engagement with said notched stop disc means, normally to hold said driven shaft in a predetermined angular position, and means for raising said stop nose out of engagement with said notched disc means when said connecting means engage radial slots of said Geneva wheel.

3. In a gear unit capable of rotating at a plurality of distinct, angular velocity ratios, representing counterclockwise motion, no motion and clockwise motion, the combination of: a driven shaft, a first and a second driving shaft parallel to each other, said shafts adapted continuously to rotate in opposite directions at constant velocities, a first and a second cam driving member fixedly mounted on each of said first and said second driving shaft, respectively, a first intermediate gear mounted coaxially on said first driving shaft in vicinity of said first cam member and a second intermediate gear mounted coaxially on said second driving shaft in vicinity of said second cam member, said first and said second driven gear normally freely rotatable about said first and said second driving shaft, respectively, a driven gear rigidly mounted on said driven shaft and meshing with both said intermediate gears, a ratchet pivotally mounted on each of said intermediate gears, notched stop disc means rigidly secured to said driven gear, a spring biased stop arm normally engaging said notched stop disc means to hold said driven gear in a predetermined angular position, and energizing means for raising said stop arm out of engagement with said notched disc means and for simultaneously selectively energizing one of said ratchets to engage one of said cam members so selectively to couple said driven shaft to one of said driving shafts.

References Cited by the Examiner

UNITED STATES PATENTS

| | | | |
|---|---|---|---|
| 2,101,774 | 12/1937 | Brasfield | 74—355 |
| 2,804,784 | 9/1957 | Blumentritt | 74—681 |

DON A. WAITE, *Primary Examiner.*

BROUGHTON G. DURHAM, *Examiner.*